(12) United States Patent
Marupaduga et al.

(10) Patent No.: US 10,470,197 B1
(45) Date of Patent: Nov. 5, 2019

(54) METHOD AND SYSTEM FOR ASSIGNING ANTENNA CONFIGURATIONS FOR RELAY BASED HETNETS

(71) Applicant: Sprint Spectrum LP, Overland Park, KS (US)

(72) Inventors: Sreekar Marupaduga, Overland Park, KS (US); Nitesh Manchanda, Overland Park, KS (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/053,038

(22) Filed: Aug. 2, 2018

(51) Int. Cl.
*H04W 72/04* (2009.01)
*H04W 64/00* (2009.01)
*H04B 7/02* (2018.01)
*H04W 72/10* (2009.01)
*H04W 88/04* (2009.01)

(52) U.S. Cl.
CPC .......... *H04W 72/10* (2013.01); *H04W 64/00* (2013.01); *H04B 7/02* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 9,001,727 B2 | 4/2015 | Yang et al. | |
| 2012/0140702 A1* | 6/2012 | Takano | H04B 7/2606 370/315 |
| 2012/0300662 A1* | 11/2012 | Wang | H04W 72/02 370/252 |
| 2013/0070664 A1 | 3/2013 | Nagata et al. | |
| 2013/0100877 A1* | 4/2013 | Naslund | H04B 7/155 370/315 |
| 2014/0018120 A1* | 1/2014 | Anbe | H04L 1/20 455/509 |
| 2016/0278003 A1* | 9/2016 | Kim | H04W 48/16 |
| 2017/0288750 A1* | 10/2017 | Qian | H04W 72/04 |
| 2018/0083664 A1* | 3/2018 | Clevorn | H04B 1/005 |

* cited by examiner

*Primary Examiner* — Candal Elpenord (57) ABSTRACT

A method and system for controlling an access node includes prioritizing a plurality of wireless devices. The method also includes monitoring a position of a relay-capable wireless device and positions of the prioritized wireless devices. The method also includes determining the position of the relay-capable wireless device meets a first distance criteria and the position of prioritized wireless devices meets a second distance criteria. The method also includes assigning the relay-capable wireless device to a carrier aggregation configuration or an antenna diversity configuration based on the position of the relay-capable device and the position of the prioritized wireless devices. The method also includes assigning the prioritized wireless devices to the diversity configuration or the carrier aggregation configuration based on the position of the prioritized wireless devices.

20 Claims, 7 Drawing Sheets

METHOD AND SYSTEM FOR ASSIGNING ANTENNA CONFIGURATIONS FOR RELAY BASED HETNETS

TECHNICAL BACKGROUND

As wireless networks evolve, the demand for high-quality service to a growing number of wireless devices or users increases. Carrier aggregation and antenna diversity communication configurations that have been developed to meet this demand.

Carrier aggregation is a communication configuration wherein one or more antennas of an access node are configured to increase bandwidth and bitrate by transmitting data over a plurality of component carriers, channels, or frequency bands simultaneously. While carrier aggregation increases bandwidth and bitrate to certain wireless device, it may take away resources from others. As the number of wireless devices under carrier aggregation increases, and as the wireless devices approach the cell edge, block error rates (BLER) and retransmission rates may increase. This increase in BLER and retransmission rates may impact battery consumption for the wireless devices, as well as impact overall load on the access node.

Antenna diversity is another configuration that has been developed to help meet the demand for high-quality service to wireless devices. Antenna diversity is a method for increasing the quality and reliability of a communication link using multiple transmitting and receiving antennas by mitigating destructive interference or fading. The method includes sending more than one data signal simultaneously using the same resource from multiple antennas of an access node. Antenna diversity increases the reliability of signal transmission to wireless device, especially devices at a cell edge. However, Antenna diversity may also impact overall load on the access node.

OVERVIEW

Embodiments described herein include methods and systems for assigning carrier aggregation or antenna diversity to heterogeneous networks based on a number of prioritized wireless devices, location of a relay-capable wireless device, and prioritized wireless devices.

An embodiment of the following description includes a method for controlling an access node including: prioritizing a plurality of wireless devices, and monitoring a position of a relay-capable wireless device and positions of the prioritized wireless devices. The method also includes determining the position of the relay-capable wireless device meets a first distance criteria and the position of prioritized wireless devices meets a second distance criteria. The method also includes assigning the relay-capable wireless device to a carrier aggregation configuration or an antenna diversity configuration based on the position of the relay-capable device and the position of the prioritized wireless devices. The method also includes assigning the prioritized wireless devices to the diversity configuration or the carrier aggregation configuration based on the position of the prioritized wireless devices.

Another embodiment of the following description includes a method for assigning configurations of wireless devices within a communications network, the method including: prioritizing a wireless device, and monitoring a position of a relay-capable wireless device and a position of the prioritized wireless device. The method also includes assigning the relay-capable wireless device to a carrier aggregation configuration or an antenna diversity configuration in response to the position of the relay-capable device meeting a first distance criteria and the position of the prioritized wireless device meeting a second distance criteria. The method also includes assigning the prioritized wireless device to the antenna diversity configuration or the carrier aggregation configuration in response to the position of the prioritized wireless device meeting the second distance criteria.

According to another embodiment, the following description includes a system for assigning configurations of wireless devices within a communications network, the system including a memory, and a processor. The processor is configured to prioritize a wireless device, and monitor a position of a relay-capable wireless device and a position of the prioritized wireless device. The processor is further configured to assign the relay-capable wireless device to a carrier aggregation configuration or an antenna diversity configuration in response to the position of the relay-capable device meeting a first distance criteria and the position of the prioritized wireless device meeting a second distance criteria. The processor assigns the prioritized wireless device to the antenna diversity configuration or the carrier aggregation configuration in response to the position of the prioritized wireless device meeting the second criteria.

DETAILED DESCRIPTION

According to embodiments described herein, an access node assigns a carrier aggregation or antenna diversity configuration to prioritized wireless devices and a relay-capable wireless device based on positions of the prioritized wireless devices and the relay-capable wireless device. For example, wireless devices may be prioritized based on Quality of Service (QoS) a quality of service (QoS), QoS Class Identifier (QCI) or Guaranteed Bit Rate (GBR) for the wireless devices. For example, the QoS may indicate a GBR for the wireless devices. The relay-capable wireless device may be a user equipment (UE) relay, for example. The relay-capable wireless device may communicate with the access node, for example a donor eNodeB or gNodeB, via a backhaul. End-user wireless devices may attach to the relay-capable wireless device which is configured to relay data packets between the access node and the end-user wireless devices via the backhaul.

The position of the prioritized wireless devices and the relay-capable wireless device may be determined with respect to the access node. The access node may determine a number of prioritized wireless devices are positioned within the cell, for example, a middle range of the cell or at a cell edge. The access node may further determine the relay-capable wireless device is at a cell edge, for example.

Based on determined positions of the prioritized wireless devices and relay-capable wireless device, and a number of prioritized wireless device, the access node assigns a carrier aggregation configuration to the prioritized wireless device and an antenna diversity configuration to the relay-capable wireless device, for example. Alternatively, based on the positions of the prioritized wireless devices and relay-capable wireless device, and a number of prioritized wireless device the access node assigns an antenna diversity configuration to the prioritized wireless device and a carrier aggregation configuration to the relay-capable wireless device, for example.

Figure 1A:
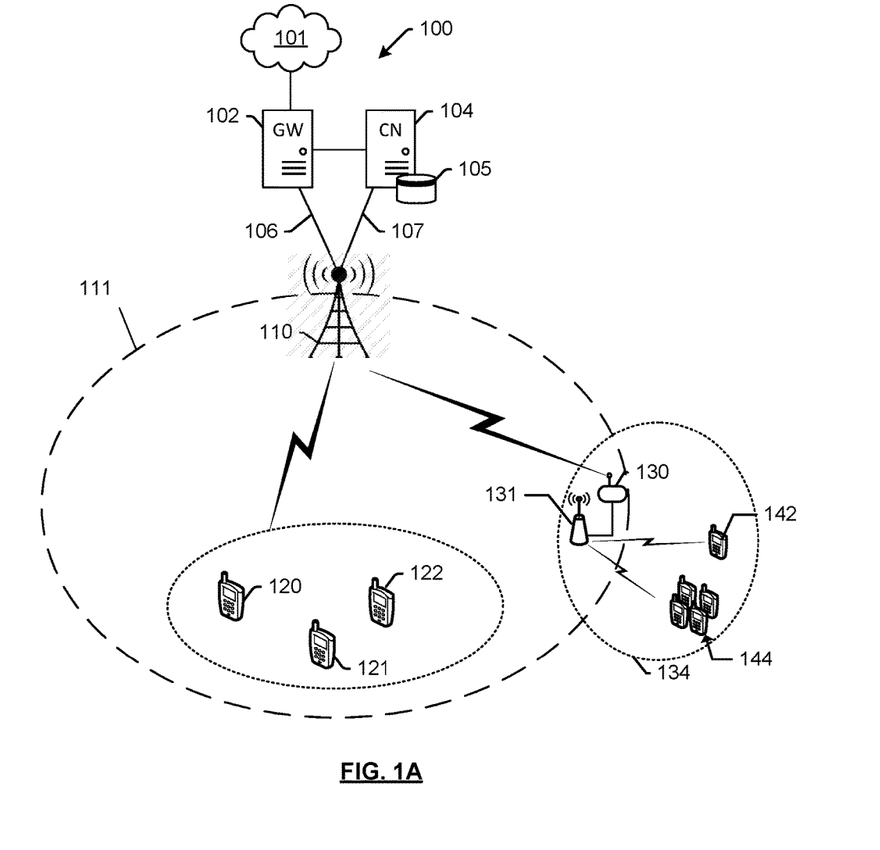
FIG. 1A is a diagram illustrating a system for controlling an access node according to an embodiment.
Figure 1B:
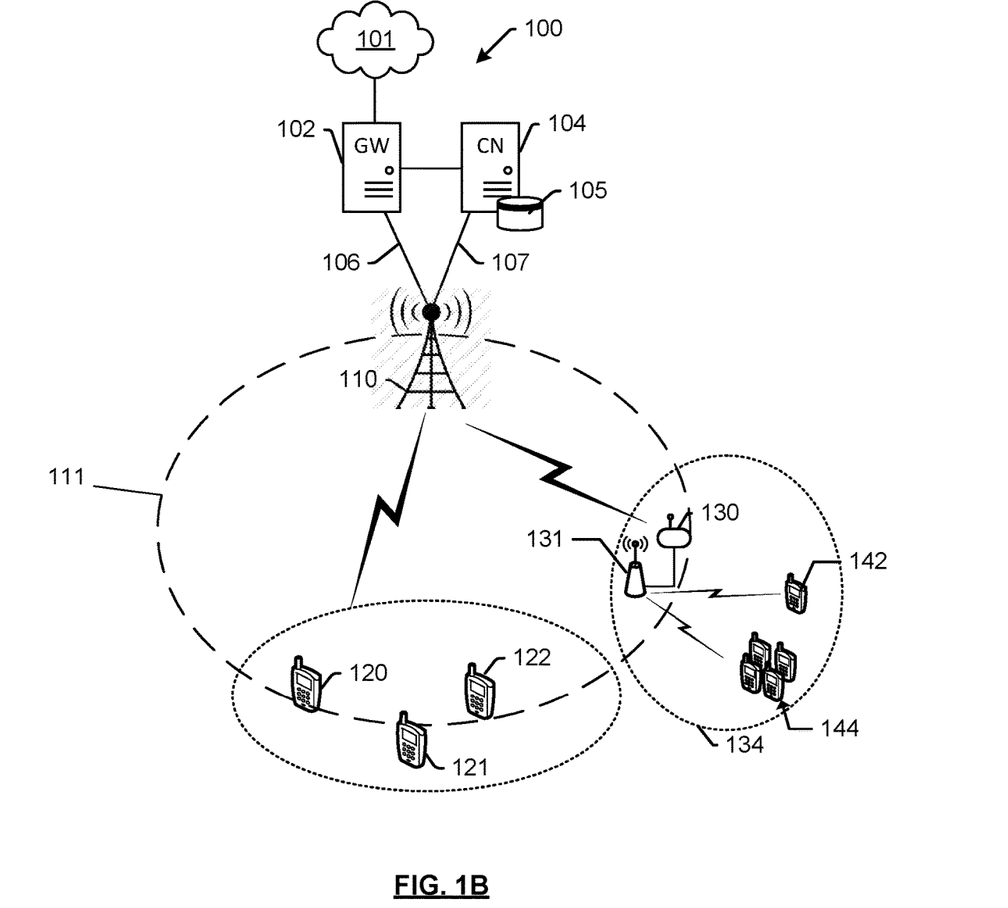
FIG. 1B is a diagram illustrating a system for controlling an access node according to an embodiment.

FIGS. 1A and 1B depict a system 100 for transmitting cell-specific reference signals. System 100 comprises a communication network 101, gateway 102, controller node 104, donor access node 110, relay-capable wireless device 130, and wireless devices 120, 121, 122, 142, and 144. In FIG. 1A, access node 110 is illustrated as having a coverage area 111, with wireless devices 120-122 being located within coverage area 111 and relay-capable wireless device 130 being located at a cell edge of the coverage area 111. In FIG. 1B, access node 110 is illustrated as having a coverage area 111, with the wireless devices 120-122 and the relay-capable wireless device 130 being located at a cell edge of the coverage area 111. The wireless devices 120-122 and relay-capable wireless device 130 access network services from access node 110. Wireless devices 142 and 144 are illustrated as being outside coverage area 111 and in communication with relay-capable wireless device 130. Wireless devices 142 and 144 may access network services via relay-capable wireless device 130. Access node 110 can be any network node configured to provide communication between end-user wireless devices 120-122, relay-capable wireless device 130, and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an embodiment, a macrocell access node can have a coverage area 111 in the range of approximately five kilometers to thirty-five kilometers and an output power in the tens of watts. In other embodiments, access node 110 can be a small access node including a microcell access node, a picocell access node, a femtocell access node, or the like such as a home NodeB or a home eNodeB device. The node may also include one or more remote radio heads disposed on a mast of the node and/or remote from the node. The remote radio head (RRH) may be connected to the node via a wired or wireless connection. The RRH includes one or more antennas connected to the node. The access node 110 can deploy or implement antenna diversity modes and/or carrier aggregation modes via a plurality of antennas as further described herein.

In antenna diversity (e.g. space diversity or spatial diversity) mode or configuration, a stream of information is transmitted on multiple antennas. For example, an antenna diversity configuration may include a stream of information transmitted over two, four, six, eight, or more antennas of the node and received by one or more antennas of a wireless device or relay-capable wireless device. The information stream may be coded differently on each of the antennas using space-frequency block codes (SFBC). SFBC may repeat data symbols over different subcarriers on each antenna of a node. In operation, a low signal to interference plus noise ratio (SINR) may be desired to decode the signal, however, signal quality may be more robust as compared to single antenna configurations.

In carrier aggregation mode or configuration, access node 110 may communicate with at least one wireless device 120, 121, 122 and 130 such that a data rate (or throughput) for the transmission of the stream of information is greater than the data rate for single carrier communication. In an embodiment, access node 110 may communicate with at least one wireless device 120, 121, 122 and 130 using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 110 and at least one wireless device 120, 121, 122 and 130, where each channel may comprise a component carrier for the communication.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

In an embodiment, relay wireless device 130 may comprise a customer premise equipment (CPE), which may be any stationary LTE wireless device having a stronger computational & RF capability versus standard wireless devices, as well as a directional antenna and a dedicated power supply. Relay wireless device 130 also may be communicatively coupled to small cell 131. Small cell 131 may include a mini-macro, picocell, femtocell, or the like that are capable of providing a wireless access point for wireless devices 142, and 144, of which wireless devices 144 comprise a cluster of wireless devices. Access node 110 is illustrated as having coverage area 111, and small cell 131 is illustrated as having coverage area 134. Relay wireless device 130 is located within coverage area 111. Wireless devices 142 and 144 are located outside coverage area 111 but within coverage area 134 of small cell 131. According to this embodiment, the cluster of wireless devices 144 may access network services using the combination of relay wireless device 130 and small cell 131, rather than overload access node 110, which may be serving numerous other devices, such as wireless devices 120-122. Moreover, wireless devices 142 and 144 that are outside coverage area 111 may access network services from access node 110 by virtue of being connected to relay wireless device 130 via small cell 131.

In an embodiment, relay wireless device 130 can be configured to function as one or more of a layer 1 (L1), layer 2 (L2), or layer 3 (L3) relay. A layer 1 relay functions as a booster or repeater. For example, a layer 1 relay device performs an amplify and forward (AF) function. RF signals received from access nodes 110 are amplified and transmitted by relay wireless device 130 to one or more of wireless devices 142 and 144. Likewise, RF signals received from wireless devices 142 and 144 are amplified and transmitted by relay wireless device 130 to access node 110. Alternatively or in addition, a layer 2 relay device performs a decode and forward (DF) function. RF signals received from access node 110 are demodulated and decoded, then encoded and modulated again before being transmitted by relay wireless device 130 to one or more of wireless devices 142 and 144. Likewise, RF signals received from one or more of wireless devices 142 and 144 are demodulated and decoded, then encoded and modulated again before being transmitted by relay wireless device 130 to access node 110. Alternatively or in addition, a layer 3 relay device also performs a decode and forward function. However, a layer 3 relay device also performs additional processing (such as ciphering and/or data concatenation/segmentation/resassembly). For example, relay wireless device may perform demodulation and decoding of the received RF signals (either uplink or downlink), processing of the received data, then encode, modulate, and transmit the data to one or more of wireless devices 142 and 144.

Relay wireless device 130 and wireless devices 120, 121, 122, 142, and 144, may be any device, system, combination of devices, or other such communication platform capable of communicating wirelessly with access node 110 using one or more frequency bands deployed by access node 110. Relay wireless device 130 and wireless devices 20, 121, 122, 142, and 144, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some embodiments, relay wireless device 130 include stronger computational & radiofrequency capabilities than an average wireless device, as well as a directional antenna, and dedicated power supply, so that they can sustain an over-the-air backhaul link for wireless devices 142 and 144 that attach to small cell 131.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by relay-capable wireless device 130 and wireless devices 121-122, 142, and 144. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (Wi-MAX), Third Generation Partnership Project Long Term Evolution (3GPP LTE), Fourth Generation broadband cellular (4G, LTE Advanced, etc.), and Fifth Generation mobile networks or wireless systems (5G or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof.

In operation, access node 110 may establish communication with relay-capable wireless device 130 and wireless devices 120, 121, 122, 142 and 144 such that access node 110 provides the wireless devices access to a communication network (e.g., communication network 101). In an embodiment, system 100 may use a plurality of carriers (e.g. frequency bands) in order to provide wireless communication services. For example, a plurality of carriers comprise bandwidth for wireless communications, for example, one or more carriers over a 2.5 GHz spectrum, a 1.25 GHz spectrum, a 1900 MHz spectrum, an 800 MHz spectrum, and the like. The carriers may include a plurality of channels, for example, 5 MHz channels, 10 MHz channels, 15 MHz channels, and the like, that may further be divided into subcarriers. In an embodiment, a frequency band may comprise a carrier, a channel, a subcarrier, a plurality of any of these, or any other suitable frequency band.

Communication links 106, 107 can use various communication media, such as air, space, metal, optical fiber, twisted pair cable, coaxial cable or some other signal propagation path, including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format, including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a packet data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to relay-capable wireless device 130 and wireless devices 120, 121, 122, 142 and 144 such as control information, location, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
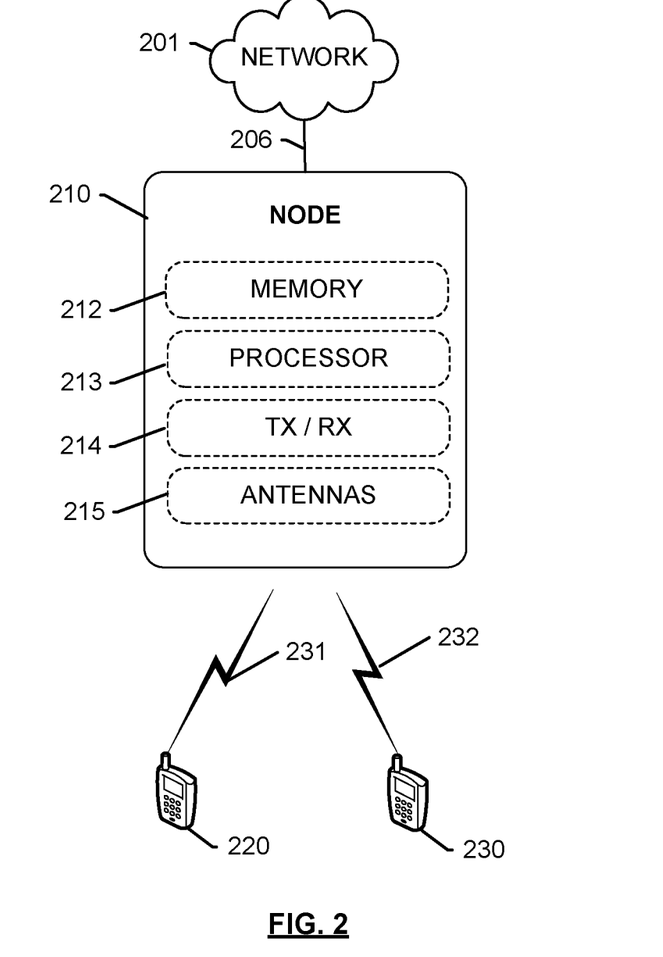
FIG. 2 is a diagram illustrating an access node according to an embodiment.

FIG. 2 depicts an example of an access node 210 for allocating resources in a wireless network. Access node 210 may be representative of access node 110 of FIGS. 1A and 1B, however embodiments are not limited thereto. Access node 210 is configured as an access point for providing network services from network 201 to end-user wireless devices 220, 230 via communication links 231, 232 respectively. Access node 210 is illustrated as comprising a memory 212 for storing logical modules that perform operations described herein, a processor 213 for executing the logical modules, and a transceiver 214 for transmitting and receiving signals via antennas 215. One or more antennas ports may connect the antennas 215 to the transceiver 214. Although only one transceiver is depicted in access node 210, additional transceivers may be incorporated in order to deploy antenna diversity and carrier aggregation modes with wireless devices 220 and 230, and to facilitate communication with other network nodes on network 201. Further, access node 210 is communicatively coupled to network 201 via communication interface 206, which may be any wired or wireless link as described above.

Figure 3:
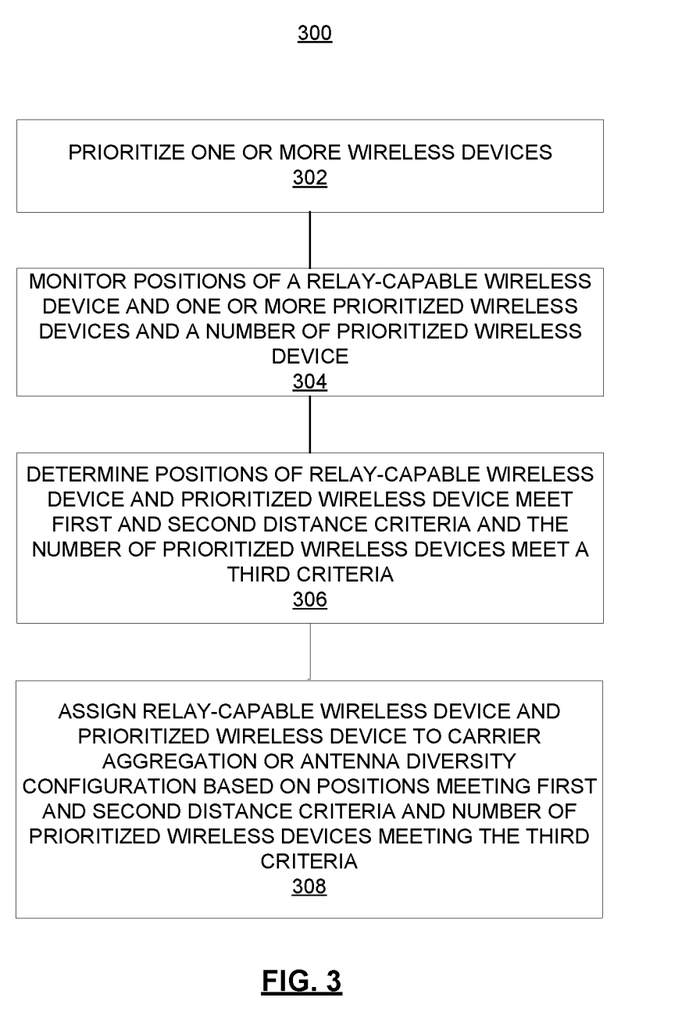
FIG. 3 is a diagram illustrating a method of assigning configurations of wireless devices within a communications network according to an embodiment.

FIG. 3 depicts an embodiment of a method 300 for controlling an access node based on a position of a relay-capable wireless device and positions of prioritized wireless devices. For example, a system, the access node, relay-capable wireless device and prioritized wireless devices may be representative of the system 100, access node 110, relay-capable wireless device 130 and prioritized wireless devices 120-122 of FIGS. 1A and 1B. According to an embodiment, the method 300 may include dynamically assigning a carrier aggregation configuration or an antenna diversity configuration to the relay-capable wireless device. The method 300 may further include dynamically assigning a carrier aggregation configuration or an antenna diversity configuration to the prioritized wireless devices.

In operation 302 of method 300, the access node prioritizes one or more wireless devices, for example wireless devices 120-122. The system may prioritize a wireless device based on a quality of service (QoS). The QoS may classify a wireless device as having a guaranteed bit rate (GBR). For example, the system via the network 101, controller node 104, or access node 110 may prioritize each wireless device of the wireless devices 120-122 as having a GBR based on a QoS for each wireless device. The QoS for each wireless device may be stored in data base 105. For example, The system 100 prioritizes wireless devices classified as having GBR over wireless devices not classified having GBR.

In operation 304, the access node may monitor positions of the one or more wireless devices 120-122 and relay-capable wireless devices 130 in relation to a coverage area 111 of the access node 110. In an embodiment, the access node may also monitor a number of prioritized wireless devices within the coverage area 111 of the access node 110. For example, the access node 110 may monitor a signal strength of a wireless device (e.g. cell ID), an observed time difference of arrival (OTDOA) or an uplink time difference of arrival (UTDOA) of a signal transmitted between the wireless device and access node. The node may also monitor a position of the wireless device based on an assisted global navigation satellite system (A-GNSS), as an example.

In operation 306, the access node may determine a distance of the relay-capable wireless device meets a first criteria and a distances of the prioritized wireless devices meet a second criteria. In an embodiment, the access node may also determine a number of prioritized wireless devices meet a third criteria. As an example, the first criteria may be a position corresponding to a cell edge of the coverage area 111 of the access node 110 and the second criteria may correspond to a position within the coverage area 111 of the access node 110 (see FIG. 1A). According to an embodiment, the first criteria and the second criteria may be positions corresponding to a cell edge of the coverage area 111 of the access node 110 (see FIG. 1B). The third criteria may correspond to a number of GBR wireless meeting a threshold defined by a network operator.

In operation 308, in response to a number of the GBR wireless devices meeting the third criteria, the relay-capable wireless device is assigned to either carrier aggregation configuration or an antenna diversity configuration and the prioritized wireless devices are assigned to an antenna diversity configuration or a carrier aggregation configuration based on positions of the relay-capable wireless devices and the prioritized wireless devices meeting the first and second distance criteria. As an example, a number of GBR wireless devices meets a third criteria when a number of GBR wireless devices reaches a threshold set by network operator. In response to the number of GBR wireless devices meeting the criteria, the relay-capable wireless device and the GBR wireless devices are assigned to either carrier aggregation configuration or an antenna diversity configuration and the prioritized wireless devices are assigned to an antenna diversity configuration or a carrier aggregation configuration based on positions of the relay-capable wireless devices and the prioritized wireless devices meeting the first and second distance criteria.

For example, referring to FIG. 1A, the positions of relay-capable wireless device meets a first distance criteria and the prioritized wireless devices 120-122 meet a second distance criteria. The first distance criteria corresponds to a position at a cell edge of a coverage area 111 of a cell of access node 110. The second distance criteria corresponds to a near to middle range of the cell of access node 110 or otherwise within the coverage area 111 of access node 110. In response, the prioritized wireless devices are assigned to a carrier aggregation configuration and the relay-capable wireless device is assigned to an antenna diversity configuration.

According to an embodiment, referring to FIG. 1B, the positions of relay-capable wireless device meets a first distance criteria and the prioritized wireless devices 120-122 meet a second distance criteria. The first distance criteria corresponds to a position at a cell edge of a coverage area 111 of a cell of access node 110. The second distance criteria corresponds to a position at a cell edge of coverage area 111 of access node 110. In response, the prioritized wireless devices are assigned to an antenna diversity configuration and the relay-capable wireless device is assigned to a carrier aggregation configuration.

In a carrier aggregation configuration, for example, the access node communicates with a wireless device using at least two carriers (e.g. two frequency bands). The two carriers may comprise a primary carrier (e.g. primary frequency band) and one or more secondary carriers (e.g. one or more second frequency bands). Data may be allocated across the primary carrier and the one or more secondary carriers and transmitted to the wireless device. The carrier aggregation configuration allows for increased data rates as compared to single carrier transmission configurations.

In an antenna diversity configuration, for example, the access node transmits the same data stream over two or more antennas. The two or more antennas transmit the same data stream (e.g. transmission signal) to the wireless device. The antenna diversity configuration allows for improved quality and reliability of wireless communication between an access node and a wireless device as compared to single antenna transmission configurations.

Figure 4:
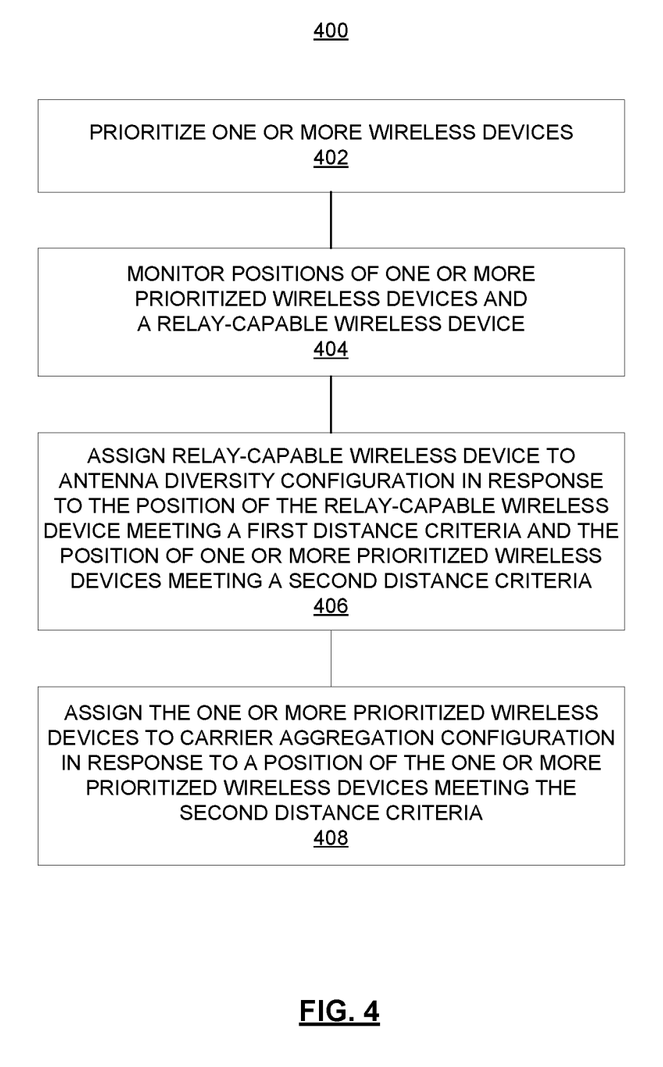
FIG. 4 is a diagram illustrating a method of assigning configurations of wireless devices within a communications network according to an embodiment.

FIG. 4 depicts an embodiment of a method 400 for controlling an access node based on a position of a relay-capable wireless device and positions of prioritized wireless devices. For example, a system, the access node, relay-capable wireless device and prioritized wireless devices may be representative of the system 100, access node 110, relay-capable wireless device 130 and wireless devices 120-122 of FIG. 1A. According to an embodiment, the method 400 may include dynamically assigning an antenna diversity configuration to the relay-capable wireless device. The method 400 may further include dynamically assigning a carrier aggregation configuration to the prioritized wireless devices.

In operation 402 of method 400, the access node prioritizes one or more wireless devices, for example wireless devices 120-122. The system may prioritize the one or more wireless devices based on a quality of service (QoS). The QoS may designate a wireless device as having a guaranteed bit rate (GBR). For example, the system via the network 101, controller node 104, or access node 110 may prioritize each wireless device of the wireless devices 120-122 as having a GBR based on a QoS for each wireless device. The QoS for each wireless device may be stored in database 105.

In operation 404, the access node may monitor positions of the one or more prioritized wireless devices 120-122 and relay-capable wireless devices 130 in relation to a coverage area 111 of the access node 110. For example, the access node 110 may monitor a signal strength of a wireless device (e.g. cell ID), an observed time difference of arrival (OT-DOA) or an uplink time difference of arrival (UTDOA) of a signal transmitted between the wireless device and access node. The node may also monitor a position of the wireless device based on an assisted global navigation satellite system (A-GNSS), as an example.

In operation 406, the system may assign the relay-capable wireless device to an antenna diversity configuration in response to the position of the relay-capable wireless device meeting a first distance criteria and the one or more prioritized wireless devices meeting a second distance criteria.

In operation 408, the one or more prioritized wireless devices are assigned to a carrier aggregation configuration in response to a position of the one or more prioritized wireless devices meeting the second distance criteria.

For example, the method 400 may be carried out by the system of FIG. 1A. Referring to FIG. 1A, a position of relay-capable wireless device meets a first distance criteria and a position of the prioritized wireless devices 120-122 meet a second distance criteria. The first distance criteria corresponds to a position at a cell edge of a coverage area 111 of a cell of access node 110. The second distance criteria corresponds to a near to middle range of the cell of access node 110 or otherwise within the coverage area 111 of access node 110. In response, the prioritized wireless devices are assigned to a carrier aggregation configuration and the relay-capable wireless device is assigned to an antenna diversity configuration.

Figure 5:
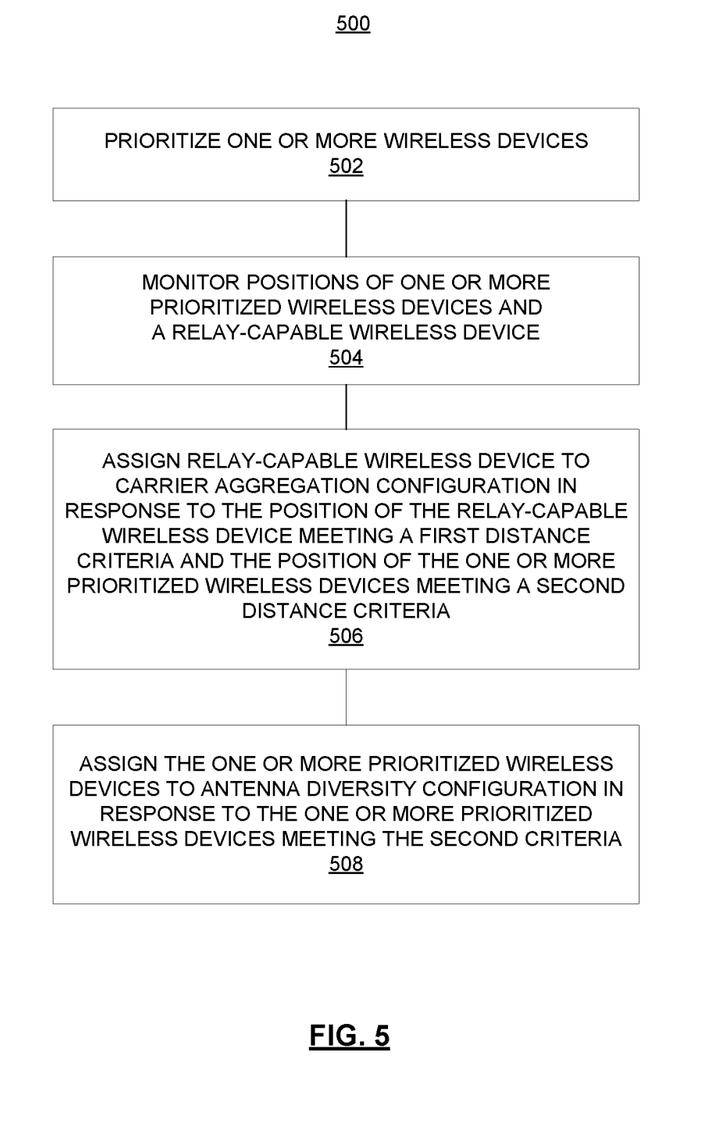
FIG. 5 is a diagram illustrating a method of assigning configurations of wireless devices within a communications network according to an embodiment.

FIG. 5 depicts an embodiment of a method 500 for controlling an access node based on a position of a relay-capable wireless device and positions of prioritized wireless devices. For example, a system, the access node, relay-capable wireless device and prioritized wireless devices may be representative of the system 100, access node 110, relay-capable wireless device 130 and wireless devices 120-122 of FIG. 1B. According to an embodiment, the method 500 may include dynamically assigning a carrier aggregation configuration to the relay-capable wireless device. The method 500 may further include dynamically assigning an antenna diversity configuration to the prioritized wireless devices.

In operation 502 of method 400, the access node prioritizes one or more wireless devices, for example wireless devices 120-122. The system may prioritize the one or more wireless devices based on a quality of service (QoS). The QoS may designate a wireless device as having a guaranteed bit rate (GBR). For example, the system via the network 101, controller node 104, or access node 110 may prioritize each wireless device of the wireless devices 120-122 as having a GBR based on a QoS for each wireless device. The QoS for each wireless device may be stored in database 105.

In operation 504, the access node may monitor positions of the one or more prioritized wireless devices 120-122 and relay-capable wireless device 130 in relation to a coverage area 111 of the access node 110. For example, the access node 110 may monitor a signal strength of a wireless device (e.g. cell ID), an observed time difference of arrival (OT-DOA) or an uplink time difference of arrival (UTDOA) of a signal transmitted between the wireless device and access node. The node may also monitor a position of the wireless device based on an assisted global navigation satellite system (A-GNSS), as an example.

In operation 506, the system may assign the relay-capable wireless device to an antenna diversity configuration in response to the position of the relay-capable wireless device meeting a first distance criteria and the one or more prioritized wireless devices meeting a second distance criteria.

In operation 508, the system may assign the one or more prioritized wireless devices to a carrier aggregation configuration in response to a position of the one or more prioritized wireless devices meeting the second distance criteria.

For example, the method 500 may be carried out by the system of FIG. 1B. Referring to FIG. 1B, a position of relay-capable wireless device meets a first distance criteria and a position of the prioritized wireless devices 120-122 meet a second distance criteria. The first distance criteria corresponds to a position at a cell edge of a coverage area 111 of a cell of access node 110. The second distance criteria corresponds to a cell edge of a coverage area 111 of access node 110. In response, the relay-capable wireless device is assigned to a carrier aggregation configuration and the one or more prioritized wireless devices are assigned to an antenna diversity configuration.

Figure 6:
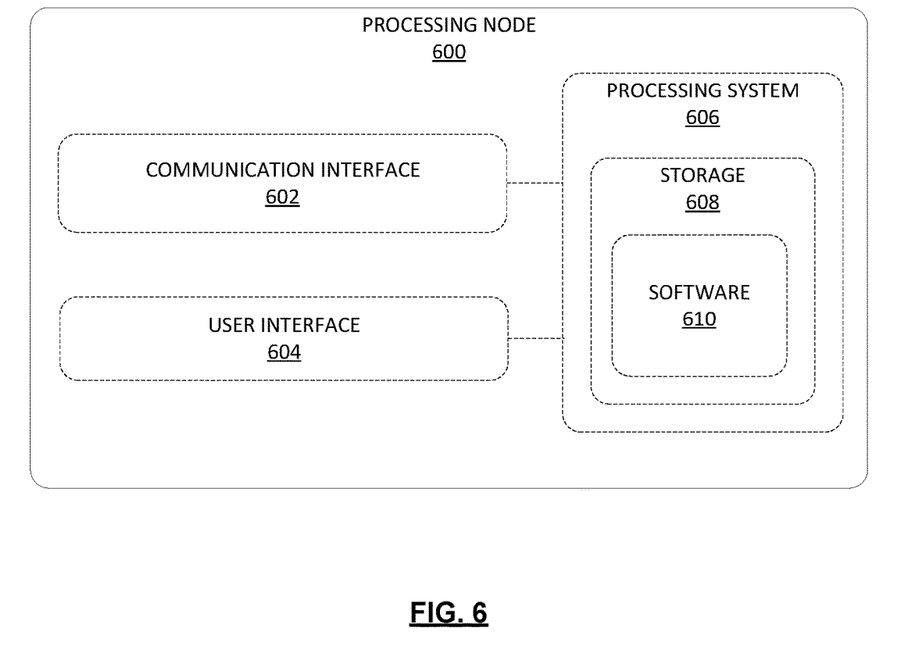
FIG. 6 is a diagram illustrating a processing node for assigning configurations of wireless devices within a communications network according to an embodiment.

FIG. 6 depicts an embodiment of a processing node for data transmission using frame reconfiguration comprising a communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a coherence determination module. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The example systems and methods described herein improve resource allocation, e.g., bandwidth allocation, and reduces BLER/retransmission rates for wireless devices and relay-capable wireless devices. Additionally, battery performance of wireless devices is also improved as compared to conventional communication systems. Therefore, the system and methods disclosed herein provide improved allocation of resources of wireless devices and relay-capable wireless devices, while also improving battery performance as compared to conventional system.

The example systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmit paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for controlling an access node comprising:
   prioritizing a plurality of wireless devices;
   monitoring a position of a relay-capable wireless device and positions of the prioritized wireless devices;
   determining the position of the relay-capable wireless device meets a first distance criteria and the position of prioritized wireless devices meets a second distance criteria;
   assigning the relay-capable wireless device to a carrier aggregation configuration or an antenna diversity configuration based on the position of the relay-capable device and the position of the prioritized wireless devices; and
   assigning the prioritized wireless devices to the antenna diversity configuration or the carrier aggregation configuration based on the position of the prioritized wireless devices.

2. The method of claim 1, wherein the prioritizing is based on a quality of service (QoS), QoS Class Identifier (QCI) or Guaranteed Bit Rate (GBR) of the wireless devices.

3. The method of claim 1, wherein the first distance criteria corresponds to a cell edge position and the second distance criteria corresponds to a position within a middle range of a cell.

4. The method of claim 3, wherein the relay-capable wireless device is assigned to the antenna diversity configuration and the prioritized wireless device is assigned to the carrier aggregation configuration.

5. The method of claim 3, wherein the second distance criteria corresponds to the cell edge position.

6. The method of claim 5, wherein the relay-capable wireless device is assigned to the carrier aggregation configuration and the prioritized wireless device is assigned to the antenna diversity configuration.

7. The method of claim 1, wherein the assigning of relay-capable wireless device and the prioritized wireless devices are further based on a number of the prioritized wireless devices.

8. The method of claim 1, wherein the assigning is further based on a number of prioritized wireless devices meeting a threshold.

9. A method for assigning configurations of wireless devices within a communications network, the method comprising:
   prioritizing a wireless device;
   monitoring a position of a relay-capable wireless device and a position of the prioritized wireless device;
   assigning the relay-capable wireless device to a carrier aggregation configuration or an antenna diversity configuration in response to the position of the relay-capable device meeting a first distance criteria and the position of the prioritized wireless device meeting a second distance criteria; and
   assigning the prioritized wireless device to the antenna diversity configuration or the carrier aggregation configuration in response to the position of the prioritized wireless device meeting the second distance criteria.

10. The method of claim 9, wherein the first distance criteria corresponds to a cell edge position and the second distance criteria corresponds to a position within a middle range of a cell.

11. The method of claim 10, wherein the antenna diversity configuration is transmit/receive diversity.

12. The method of claim 11, wherein the relay-capable wireless device is assigned to the antenna diversity configuration and the prioritized wireless device is assigned to the carrier aggregation configuration.

13. The method of claim 9, wherein the first distance criteria corresponds to a cell edge position and the second distance criteria corresponds to the cell edge position.

14. The method of claim 13, wherein the relay-capable wireless device is assigned to the carrier aggregation configuration and the prioritized wireless device is assigned to the antenna diversity configuration.

15. A system for assigning configurations of wireless devices within a communications network, the system comprising:
   a memory; and
   a processor configured to:
     prioritize a wireless device;
     monitor a position of a relay-capable wireless device and a position of the prioritized wireless device;
     assign the relay-capable wireless device to a carrier aggregation configuration or an antenna diversity configuration in response to the position of the relay-capable device meeting a first distance criteria and the position of the prioritized wireless device meeting a second distance criteria; and
     assign the prioritized wireless device to the antenna diversity configuration or the carrier aggregation configuration in response to the position of the prioritized wireless device meeting the second criteria.

16. The system of claim 15, wherein the first distance criteria corresponds to a cell edge position.

17. The system of claim 16, wherein the second distance criteria corresponds to a position within a middle range of a cell.

18. The system of claim 17, wherein the relay-capable wireless device is assigned to the antenna diversity configuration and the prioritized wireless device is assigned to the carrier aggregation configuration.

19. The system of claim 16, wherein the second distance criteria corresponds to the cell edge position.

20. The system of claim 19, wherein the relay-capable wireless device is assigned to the carrier aggregation configuration and the prioritized wireless device is assigned to the antenna diversity configuration.

* * * * *